US009621560B2

(12) United States Patent
Huang et al.

(10) Patent No.: US 9,621,560 B2
(45) Date of Patent: Apr. 11, 2017

(54) CONFIRMING AN IDENTITY OF A USER OF A SOCIAL NETWORK

(71) Applicant: LinkedIn Corporation, Mountain View, CA (US)

(72) Inventors: Xiaosu Huang, Sunnyvale, CA (US); Chi-Yi Kuan, Fremont, CA (US); Haipeng Li, Mountain View, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 118 days.

(21) Appl. No.: 14/610,809

(22) Filed: Jan. 30, 2015

(65) Prior Publication Data

US 2016/0226881 A1    Aug. 4, 2016

(51) Int. Cl.
*G06F 15/16* (2006.01)
*H04L 29/06* (2006.01)
*G06F 3/0482* (2013.01)
*G06Q 50/00* (2012.01)

(52) U.S. Cl.
CPC .......... *H04L 63/102* (2013.01); *G06F 3/0482* (2013.01); *G06Q 50/00* (2013.01)

(58) Field of Classification Search
CPC .... H04L 63/102; H04L 65/403; G06F 3/0482
See application file for complete search history.

(56) References Cited

U.S. PATENT DOCUMENTS

| | | | |
|---|---|---|---|
| 2009/0080635 A1* | 3/2009 | Altberg | G06Q 30/02 379/216.01 |
| 2010/0250676 A1* | 9/2010 | Ufford | G06Q 10/107 709/204 |
| 2010/0293476 A1* | 11/2010 | Rosenblum | H04L 12/6418 715/753 |
| 2010/0293600 A1 | 11/2010 | Schechter et al. | |
| 2013/0036458 A1* | 2/2013 | Liberman | H04L 9/3231 726/6 |
| 2013/0073974 A1* | 3/2013 | Bladel | G06Q 50/01 715/739 |
| 2013/0305336 A1* | 11/2013 | Konertz | H04L 67/306 726/7 |
| 2014/0188988 A1* | 7/2014 | Kane | H04L 29/06 709/204 |

* cited by examiner

*Primary Examiner* — Krisna Lim
(74) *Attorney, Agent, or Firm* — Schwegman Lundberg & Woessner, P.A.

(57) ABSTRACT

In cases where a user of a social network has lost access to one or more email addresses on file with the social network, the social network may confirm an identity of the user before issuing a new password. The social network may confirm the identity of the user by prompting the user to correctly identify pictures of members of the social network that are connected to the user, selecting or receiving a selection of a plurality of trustees (e.g., members of the social network who are connected to the user), prompting the trustees to confirm with the user that the user has lost the access, and receiving notification that at least a specified number of the trustees have confirmed with the user that the user has lost the access. After the social network confirms the identity, the social network may provide a new password to the user.

20 Claims, 6 Drawing Sheets

FIG. 6

CONFIRMING AN IDENTITY OF A USER OF A SOCIAL NETWORK

BACKGROUND

A social network system is a computer or web-based service that enables users to establish links or connections with persons for the purpose of sharing information with one another. Some social network systems aim to enable friends and family to communicate and share with one another, while others are specifically directed to business users with a goal of establishing professional networks and sharing business information. For purposes of the present disclosure, the terms "social network" and "social network system" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

In the following, a detailed description of examples will be given with references to the drawings. It should be understood that various modifications to the examples may be made. In particular, elements of one example may be combined and used in other examples to form new examples.

Many of the examples described herein are provided in the context of a social or business networking website or service. However, the applicability of the inventive subject matter is not limited to a social or business network system. The present inventive subject matter is generally applicable to a wide range of information services.

A social network system is a service provided by one or more computer systems accessible over a network that allows members of the service to build or reflect social networks or social relations among members. Typically, members construct profiles, which may include personal information such as the member's name, contact information, employment information, photographs, personal messages, status information, multimedia, links to web-related content, blogs, and so on. In order to build or reflect these social networks or social relations among members, the social network system allows members to identify, and establish links or connections with other members. For instance, in the context of a business network system (a type of social network system), a person may establish a link or connection with his or her business contacts, including work colleagues, clients, customers, personal contacts, and so on. With a social network system, a person may establish links or connections with his or her friends, family, or business contacts. While a social network system and a business network system may be generally described in terms of typical use cases (e.g., for personal and business networking, respectively), it will be understood by one of ordinary skill in the art that a business network system may be used for personal purposes (e.g., connecting with friends, classmates, former classmates, and the like) as well as or instead of business networking purposes and a social network system may likewise be used for business networking purposes as well as or in place of social networking purposes. A connection may be formed using an invitation process in which one member invites a second member to form a link. The second member then has the option of accepting or declining the invitation.

In general, a connection or link represents or is otherwise associated with an information access privilege, such that a first person who has established a connection with a second person is, via the establishment of that connection, authorizing the second person to view or access certain non-publicly available portions of their profiles that may include communications they have authored. Example communications may include blog posts, messages, wall postings, or the like. Depending on the particular implementation of the business/social network system, the nature and type of the information that may be shared, as well as the granularity with which the access privileges may be defined to protect certain types of data, may vary greatly.

Some social network systems may offer a subscription or following process to create a connection instead of or in addition to the invitation process. A subscription or following model is where one member follows another member without the need for mutual agreement. Typically in this model, the follower is notified of public messages and other communications posted by the member that is followed. An example social network system that follows this model is Twitter®, which is a micro-blogging service that allows members to follow other members without explicit permissions. Other, connection based social network systems also may allow following type relationships as well. For example, the social network system LinkedIn® allows members to follow particular companies.

A user may set up an account with the social network. In some examples, when the account is being set up, the social network may ask the user for information that may be used to contact the user, such as one or more email addresses. Once the account is set up, the user may access the account using a username and password. The one or more email addresses are retained on file in the social network, and may be changed or updated as needed by the user.

In instances when a user forgets the password, the user may request a new password from the social network. Typically, in response to a password change request, the social network may send the user password-updating information via email to the one or more email addresses on file at the social network.

Unfortunately, there may be instances when the user no longer has access to the one or more email addresses on file at the social network. For instance, an email address on file may be for a previous job held by the user, or may be for a closed email account. For cases where the user forgets the password and no longer has access to the one or more email addresses on file at the social network, the user may have significant difficulty accessing the account on the social network. This condition may be referred to as No Access to Primary Email address ("NAPE").

When confronting NAPE, a user may turn to the customer service features on the social network. In many cases, the customer service features involved with resetting a password for a user with NAPE are non-automated, and, as a result, may be tedious and labor-intensive. For instance, in order to reset a password for a user, a social network may require proof of a user's identity. In some examples, such proof may include submission of a scan or photo of a photo ID as well as a utility bill that shows the same address as the photo ID. For the user, this process may be burdensome, and may raise concerns about privacy when sending a scan or photo of a photo ID. This is but one example; other non-automated examples may also be burdensome for the user and labor-intensive for the social network.

For purposes of the present disclosure, the term member is intended to specify a person who has an account on the social network. For purposes of the present disclosure, the term user is intended to specify the member who has lost access to the one or more email addresses on file with the social network.

Disclosed in some examples are systems, methods, and machine readable media for an automated process for confirming an identity of a user of a social network who has lost access to one or more email addresses on file with the social network. In response to a password change request submission, the system may first verify that the entity submitting the password change request is a human, rather than a robot. For instance, the system may show to the user pictures of members connected to the user, and prompt the user to identify names of the shown members. After the system has verified that a person is submitting the password change request, the system may select or receive a selection of trustees. The trustees may be members of the social network who are connected to the user. These trustees may, but need not be, the members whose pictures are shown to the user. The system may prompt the trustees to confirm with the user that the user has lost access to the one or more email addresses on file with the social network. In some examples, the system may direct the trustees to confirm using other communications outside the social network, such as telephone or texts. In some examples, the social network may deliver a code to each trustee, and direct the trustee to provide the code to the user. The user may enter the codes received from the trustees into the social network, and thereby demonstrate that the trustees have contacted the user. When the social network receives notification that at least a specified number of the trustees have confirmed with the user, the social network may change the password of the account for the user.

Figure 1:
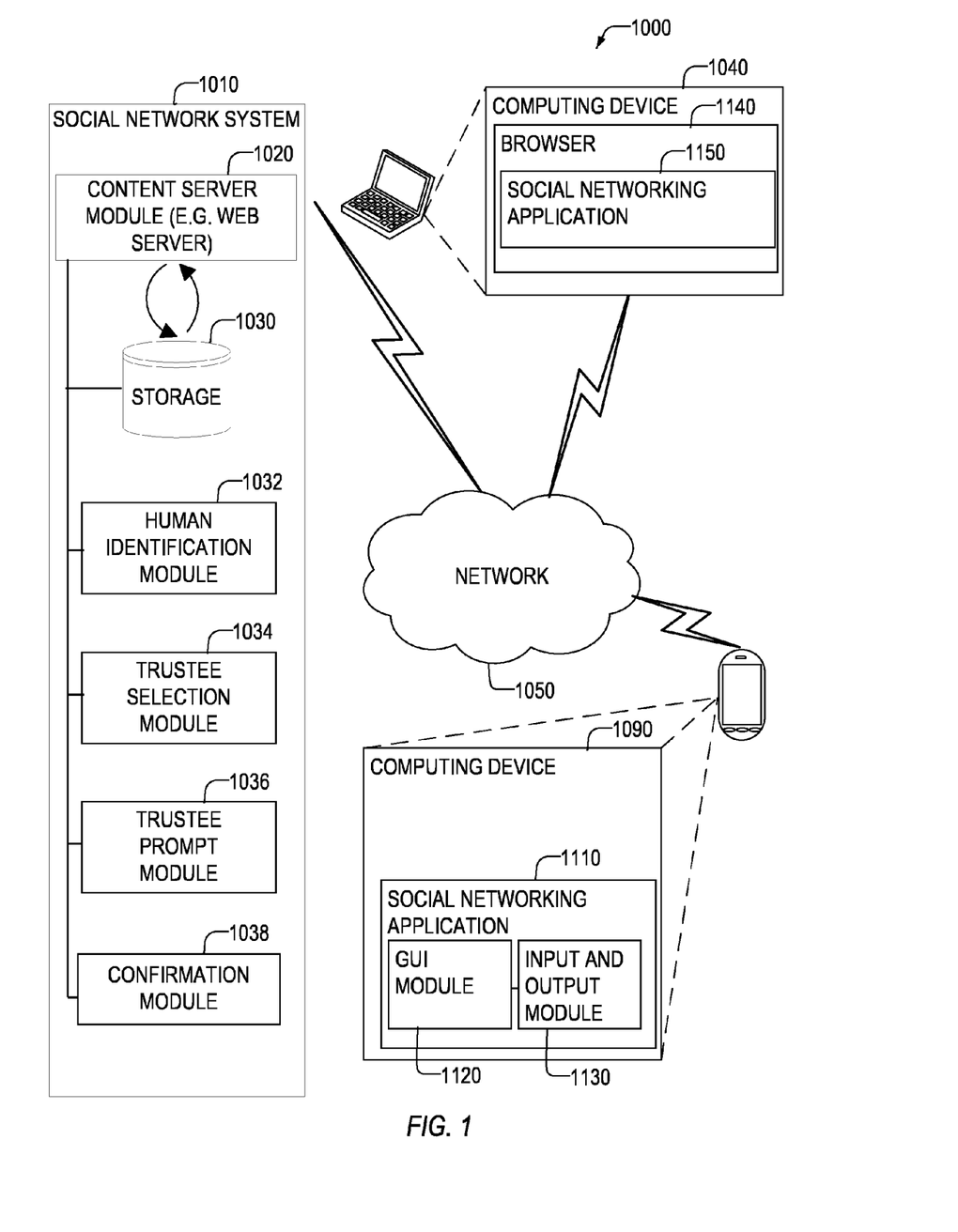
FIG. 1 shows a diagram of a social network service, in accordance with some examples.

FIG. 1 shows a diagram of a social network service 1000, in accordance with some examples. Social network system 1010 may contain a content server process 1020. Content server process 1020 may communicate with storage 1030 and may communicate with one or more computing devices 1040 and 1090 through a network 1050. Content server process 1020 may be responsible for the retrieval, presentation, and maintenance of member profiles stored in storage 1030 as well as the retrieval, creation, and presentation of a user interface for users. Content server process 1020 in one example may include or be a web server that fetches or creates internet web pages. Web pages may be or include Hyper Text Markup Language (HTML), eXtensible Markup Language (XML), JavaScript, or the like. The web pages may include portions of, or all of, a member profile at the request of users 1040. The content server process 1020 may also be responsible for allowing members to communicate with one another, establish connections, and post multimedia files (e.g., pictures, videos, and the like).

Users of computing devices 1040 and 1090 may include one or more members, prospective members, or other users of the social network system 1010. Computing devices 1040 and 1090 communicate with social network system 1010 through a network 1050. The network may be any means of enabling the social network system 1010 to communicate data with computing devices 1040, 1090. Example networks 1050 may be or include portions of one or more of: the Internet, a Local Area Network (LAN), a Wide Area Network (WAN), wireless network (such as a wireless network based upon an IEEE 802.11 family of standards), a Metropolitan Area Network (MAN), a cellular network, or the like.

Computing device 1040 may be a laptop, desktop, tablet, cellphone or any other computing device which may provide a social networking application 1150 in conjunction with browser 1140. Social networking application 1150 may be one or more of hypertext markup language (HTML), javaScript, Java, or other browser executable objects that are executed within the browser 1140 to provide social networking functionality to a user. The social networking application 1150 may be deployed to the computing device 1040 by content server process 1020 through interaction with browser 1140.

Computing device 1090 may be a laptop, desktop, tablet, cellphone, or any other computing device which may provide a social networking functionality to the user through execution of a social networking application 1110. Social networking application 1110 may include a graphical user interface (GUI) module 1120 which may provide a graphical user interface output to a display which may show social networking information. Input and output module 1130 may accept input and process it in order to update the graphical user interface provided by the GUI module 1120. Input and output module 1130 may interface with the social network system 1010 through the content server process 1020 using one or more application programming interfaces (APIs). For example input and output module may receive data related to the social network system (e.g., member profile information, GUI information, and other data) by interfacing through one or more application programming interfaces (APIs).

Both social networking applications 1150 and 1110 may provide social networking functionality to users in conjunction with content server process 1020, and in some examples in conjunction with storage 1030. Social networking functionality may include viewing, editing, or deleting information in member profiles, communicating with other members, adding or removing skills, and the like.

The social network system may include various modules, connected to the content server module 1020 and storage 1030, which may prompt a user or member and receive input from the user or member. In response to a password change request from a user who has lost access to one or more email addresses on file with the social network, the modules may confirm an identity of the user.

A human identification module 1032 may confirm that the entity who submitted the password change request is a human, rather than a robot or other non-human entity. In some examples, the human identification module 1032 may include a graphical user interface that prompts the user to respond to text and/or images displayed on the graphical user interface in a manner that would be apparent to the user, who is a human, but would befuddle a robot or non-human entity. For instance, the human identification module 1032 may prompt the user to correctly identify pictures of members of the social network that are connected to the user. In some examples, the human identification module 1032 may prompt the user to respond in a manner that would be suitable for a human (not necessarily the user), but not suitable for a robot or non-human entity. For instance, the human identification module 1032 may display a picture on the graphical user interface, and prompt the user to enter one or more alphanumeric characters embedded in the picture. These are but two examples for the human identification module 1032; other suitable examples may also be used.

A trustee selection module 1034 may determine trustees. The trustees may be members of the social network who are connected to the user. In some examples, the trustee selection module 1034 may include a graphical user interface that prompts the user to select the trustees. For instance, the graphical user interface may display names and/or pictures of the user's connections, and may allow the user to choose the trustees from the displayed names and/or pictures. In some examples, the graphical user interface may advise the user to select trustees that have a good relationship to the user, so that the trustee may easily contact the user outside the social network, such as by telephone or text. In other examples, the trustee selection module 1034 may select the trustees from the user's connections, without requesting input from the user.

The trustee selection module 1034 may determine the trustees after the user submits the password change request, rather than requiring the user to select trustees at an earlier time, such as when the user opens the user's account. Requiring the trustee selection when registering the account may be time-consuming, and may dissuade a person from completing the registration process. In addition, at the time of account creation, the user isn't connected to any other members, making trustee selection problematic. In addition, as a user's relationships with the user's connections evolve, trustees selected too long ago may not have stayed in touch with the user, and may not be able to contact the user outside the social network, such as by telephone or text.

A trustee prompt module 1036 may prompt the trustees to confirm with the user that the user has lost access to the user's one or more email addresses on file with the social network. For instance, the trustee selection module 1034 may notify each trustee, such as by an internal notification within the social network, or an external email sent to an email address on file for the trustee. In some examples, the trustee notification may include a statement that the user has lost access to the user's email address and is requesting a password change, and instructions on how to respond. In some examples, the instructions may include a clickable link that provides a code to the trustee. In some examples, the instructions may direct the trustee to contact the user outside the social network, such as by telephone or text, to confirm that the user really did lose access to the user's email address. In some examples, the instructions may direct the trustee to provide the code to the user. In some examples, the instructions may direct the trustee to contact the user, confirm with the user that the user really did lose access to the user's email address, then confirm with the social network that the user really did lose access to the user's email address.

A confirmation module 1038 may receive a notification that at least a specified number of the trustees have confirmed with the user that the user has lost access to the user's one or more email addresses on file with the social network. In some examples, the confirmation module 1038 may include a graphical user interface that prompts the user to enter codes supplied by the trustees. In some examples, the confirmation module 1038 may include a graphical user interface that prompts a trustee for confirmation that the user really did lose access to the user's email address. The specified number may be a specified fraction of the total number of trustees, such as 60%, 80%, or 100%. The specified fraction may be high enough to generate a meaningful sample of trustees' responses, but low enough to accommodate uncooperative trustees. If the confirmation module 1038 receives notification from at least the specified number of trustees, the confirmation module 1038 may direct the social network to change the user's password.

Figure 2:
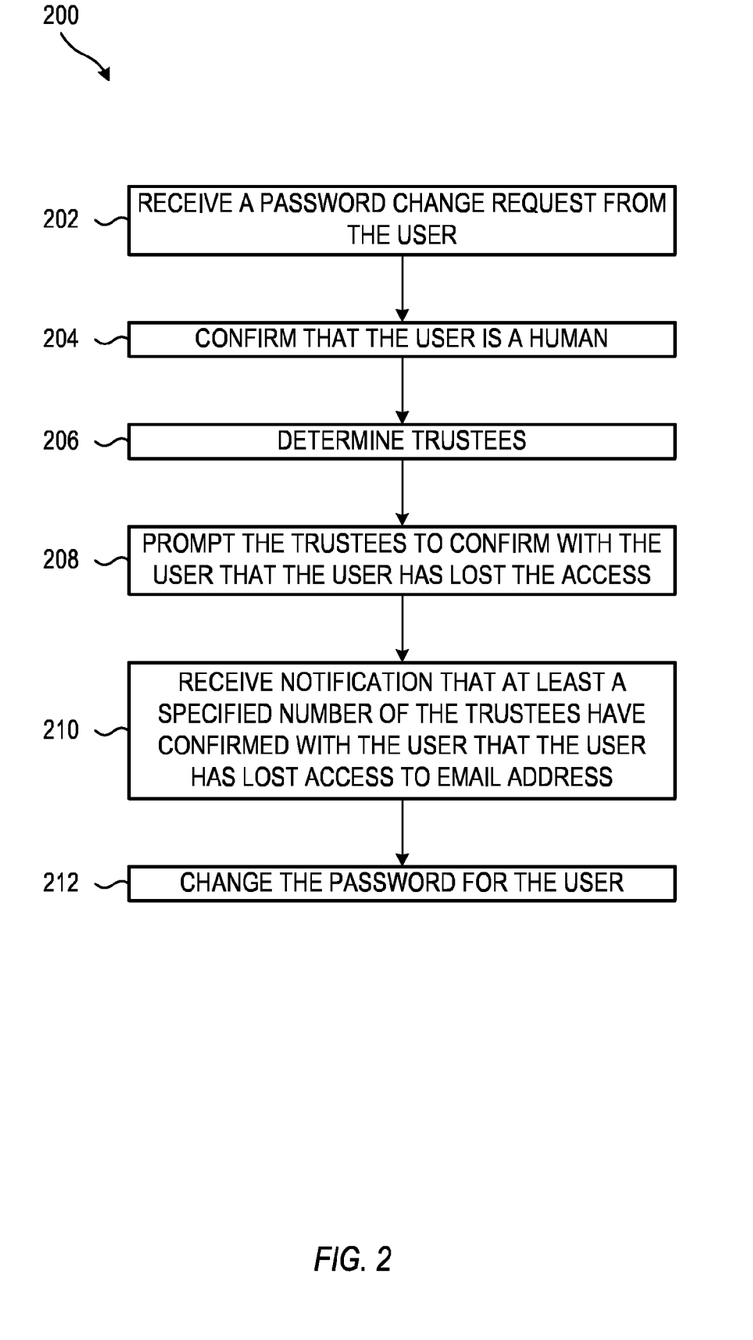
FIG. 2 shows an example of a method for confirming an identity of a user of a social network who has lost access to one or more email addresses on file with the social network, in accordance with some examples.

FIG. 2 shows an example of a method 200 for confirming an identity of a user of a social network who has lost access to one or more email addresses on file with the social network, in accordance with some examples. The method 200 may be executed on at least one computer processor of a social network, such as social network service 1000 (FIG. 1). The method may be implemented in whole or in part by one or more modules of the social networking service 1000 (FIG. 1), such as the human identification module 1032, the trustee selection module 1034, the trustee prompt module 1036, and the confirmation module 1038. This is but one example; other suitable methods may also be used to confirm the identity of the user of the social network who has lost access to the one or more email addresses on file with the social network.

At operation 202, a password change request is received from the user. For instance, the user may click on a link in a graphical user interface provided by the social network. The link may include text that indicates that the user has lost access to the one or more email addresses on file with the social network, such as "Forgot Password?" or "Forgot Password and Lost Access To Email?"

Figure 3:
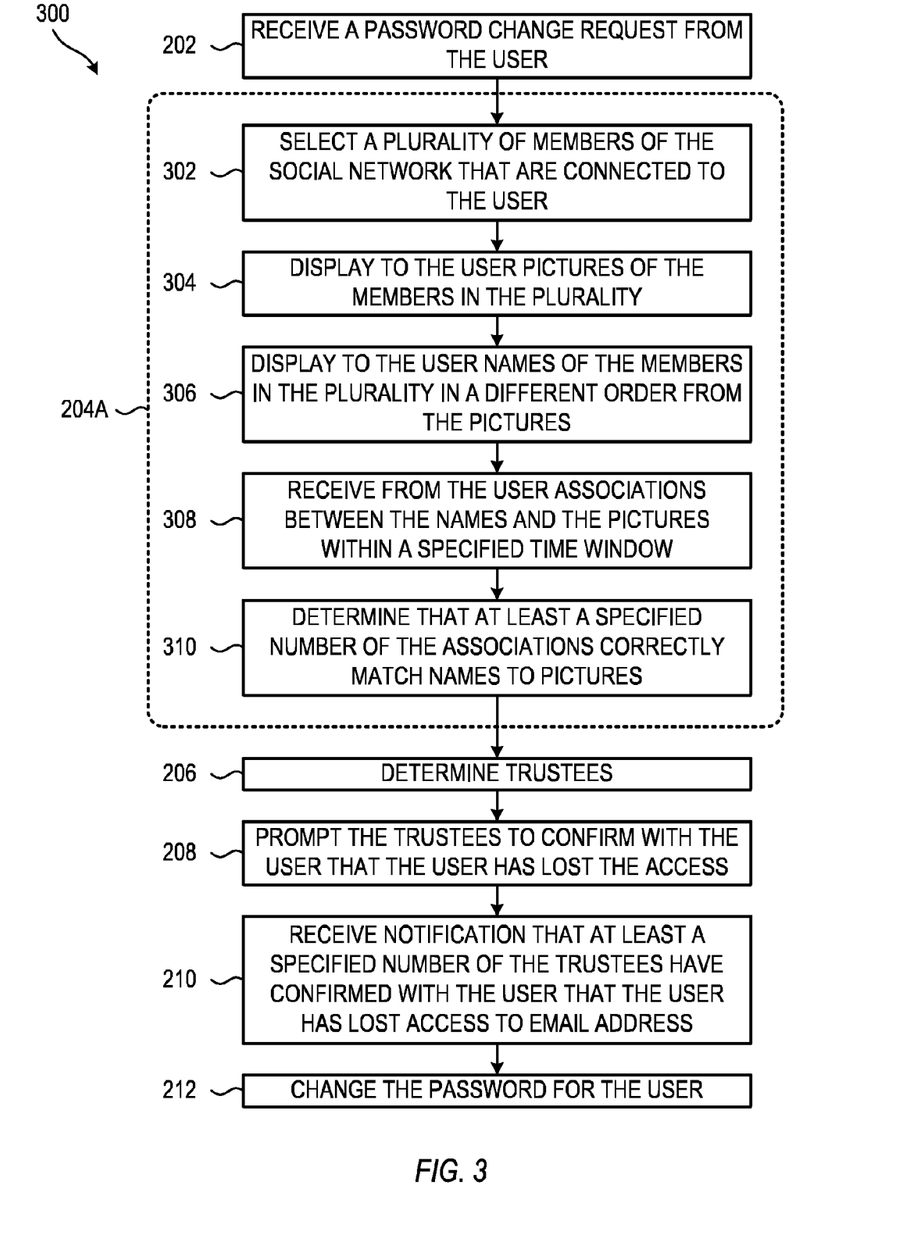
FIG. 3 shows another example of a method for confirming an identity of a user of a social network who has lost access to one or more email addresses on file with the social network, in accordance with some examples.
Figure 4:
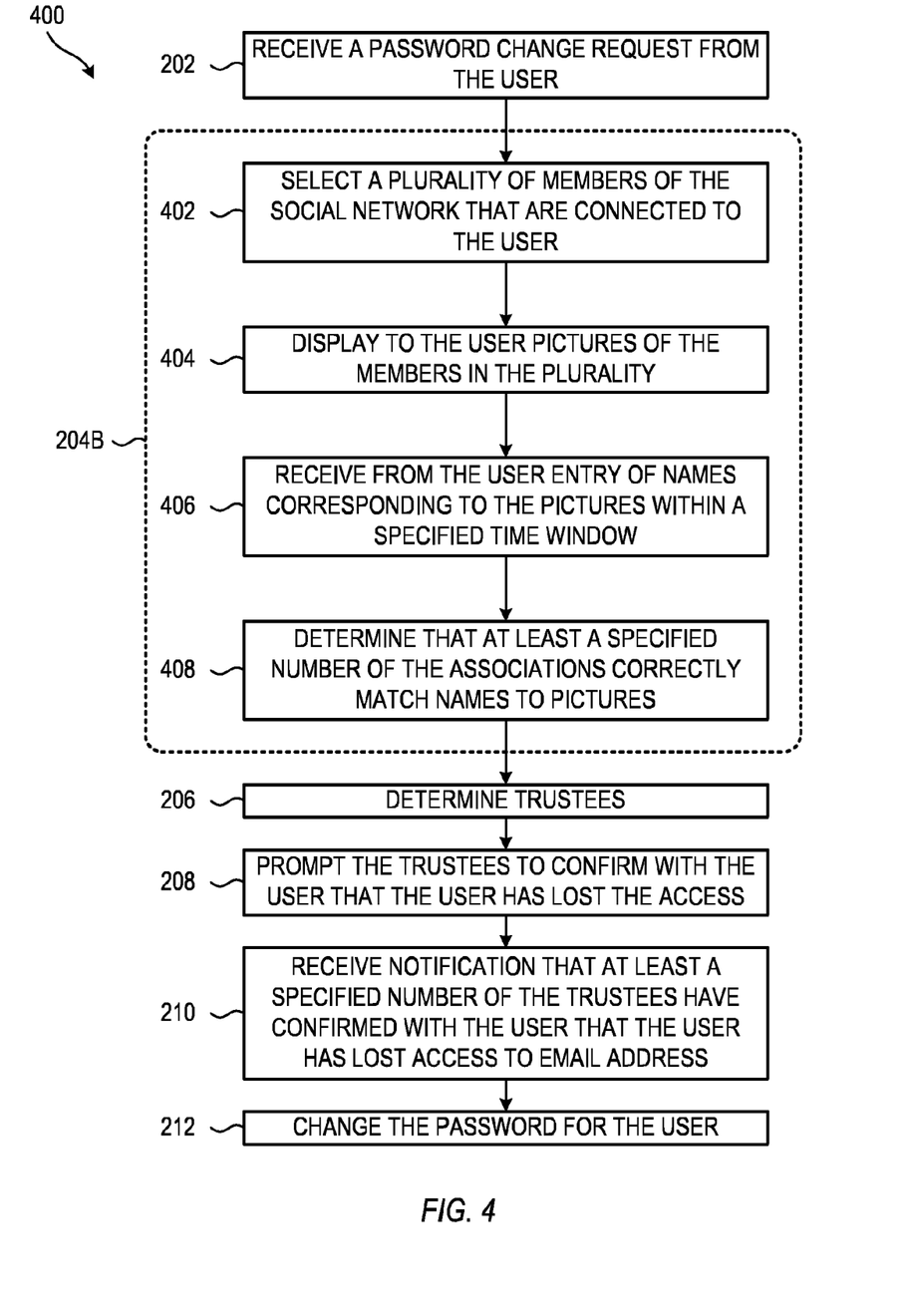
FIG. 4 shows another example of a method for confirming an identity of a user of a social network who has lost access to one or more email addresses on file with the social network, in accordance with some examples.

Operation 204 confirms that the user is a human, rather than a robot or automated entity on the internet. In some examples, the user is prompted to correctly identify pictures of members of the social network that are connected to the user. In some examples, operation 204 may display pictures of faces of people connected to the user on a graphical user interface, and may prompt the user to enter the first names of the displayed people into the graphical user interface. The displayed pictures may be profile pictures of the user's connections, pictures in which the user's connections are tagged, or other suitable pictures. In these examples, the user may find it easier to remember just the first names, rather than both first and last names. The graphical user interface may limit the name entry to within a specified time limit, such as one minute. It is expected that the time limit may prevent an automated entity from searching through the social network, or searching another social network or the internet, to find the first names of the displayed people. In some examples, the graphical user interface may allow passage of the user to subsequent operations only if the user correctly identifies a specified number of the displayed pictures or a specified percentage of the displayed pictures, such as four out of five, or 80%. If the user fails to correctly identify at least the specified percentage, the graphical user interface may repeat operation 204 a specified number of times, such as one or two. Limiting the number of attempts to the specified number may discourage imposters and may therefore enhance security for the social network. Two specific examples for operation 204 are shown in FIGS. 3 and 4, and are discussed in detail below.

At operation 206, a plurality of trustees is determined. The trustees may be members of the social network who are connected to the user. In some examples, the at least one computer processor may receive the selection of the trustees from the user. For instance, the graphical user interface may allow the user to select the trustees from a list of names and/or pictures of members connected to the user. In some examples, the graphical user interface may allow the user to select the trustees after receiving a password change request from the user, and then after prompting the user to correctly identify the pictures of members of the social network that are connected to the user. In other examples, the social network may perform the selection of the trustees. In some examples, there may be two, three, four, five, six, or more than six trustees in the plurality.

Figure 5:
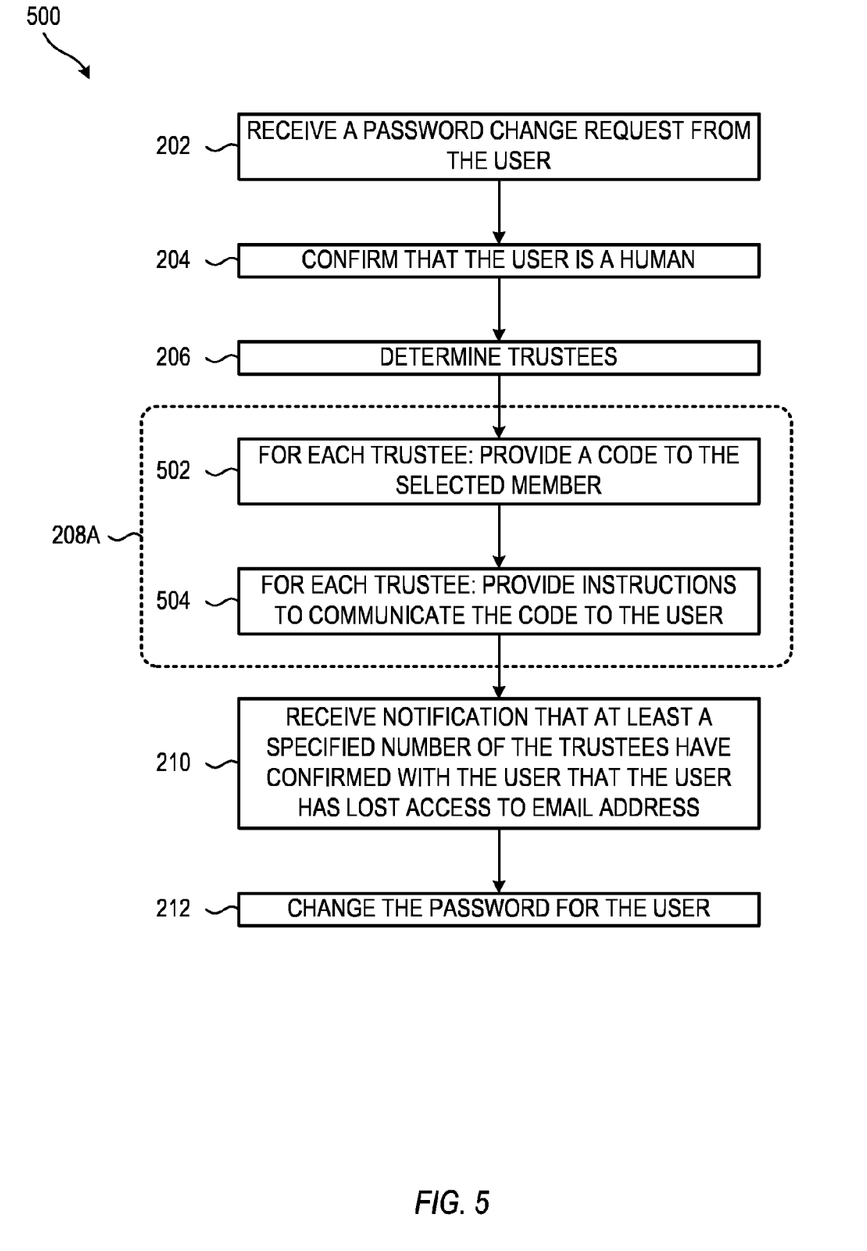
FIG. 5 shows another example of a method for confirming an identity of a user of a social network who has lost access to one or more email addresses on file with the social network, in accordance with some examples.

At operation 208, the trustees are prompted to confirm with the user that the user has lost access to the one or more email addresses on file with the social network. In some examples, the trustees may be instructed to perform the confirmation outside the social network, such as by telephone or text. A specific example for operation 208 is shown in FIG. 5, and is discussed in detail below.

At operation 210, the at least one computer processor receives notification that at least a specified number of the trustees have confirmed with the user that the user has lost the access. In some examples, the specified number is one, two, three, four, five, or more than five. In some examples, the specified number is expressed as a percentage of the total number of trustees, such as 40%, 50%, 60%, 70%, 80%, or more than 80%. If the specified number or fraction is equaled or exceeded, the method may proceed to operation 212, where the social network may change the password for the user. If the specified number or fraction is not equaled or exceeded, the method may prevent the social network from changing the password for the user.

FIG. 3 shows another example of a method 300 for confirming an identity of a user of a social network who has lost access to one or more email addresses on file with the social network, in accordance with some examples. Compared with the method 200 of FIG. 2, method 300 includes further detail regarding operation 204A, at which the user is prompted to correctly identify pictures of members of the social network that are connected to the user. In operation 204A, the social network selects which members to include in the plurality.

At operation 302, the at least one computer processor may select a plurality of members of the social network that are connected to the user. In some examples, the at least one computer processor may select the plurality of members to include members connected to the user who have most recently interacted with the user through the social network. In some examples, the at least one computer processor may select a specified number of members, such as two, three, four, five, six, or more than six, for the plurality.

At operation 304, the at least one computer processor may display to the user, on a graphical user interface, pictures of faces of the members in the plurality. The plurality may include two, three, four, five, six, or more than six members.

At operation 306, the at least one computer processor may display to the user, on the graphical user interface, names of the members in the plurality. In some examples, the names may be displayed in a different order from the pictures.

At operation 308, the at least one computer processor may receive from the user, on the graphical user interface, associations between the names and the pictures. For instance, the graphical user interface may prompt the user to match names from a list to pictures from another list. In some examples, the graphical user interface may limit the input of the associations to within a specified time window, such as 30 seconds or one minute. Other suitable time windows may also be used.

At operation 310, the at least one computer processor may determine that at least a specified number of the associations correctly match the names to the pictures. The specified number of associations may be two, three, four, five, or more than five, or may be expressed in terms of a fraction of the displayed pictures.

FIG. 4 shows another example of a method 400 for confirming an identity of a user of a social network who has lost access to one or more email addresses on file with the social network, in accordance with some examples. Compared with the method 300 of FIG. 3, method 400 includes a different example for operation 204B, at which the user is prompted to correctly identify pictures of members of the social network that are connected to the user. In operation 204B, the user selects which members to include in the plurality.

At operation 402, the at least one computer processor may select a plurality of members of the social network that are connected to the user. In some examples, the at least one computer processor may select the plurality of members to include members connected to the user who have most recently interacted with the user through the social network.

At operation 404, the at least one computer processor may display to the user, on a graphical user interface, pictures of the members in the plurality.

At operation 406, the at least one computer processor may receive from the user, on the graphical user interface, entry of names corresponding to the pictures. In some examples, the graphical user interface may limit the entry of the names to within a specified time window, such as 30 seconds or one minute.

At operation 408, the at least one computer processor may determine that at least a specified number of the names are correctly associated with the pictures.

FIG. 5 shows another example of a method 500 for confirming an identity of a user of a social network who has lost access to one or more email addresses on file with the social network, in accordance with some examples. Compared with the method 200 of FIG. 2, method 300 includes further detail regarding operation 208A, at which the trustees are prompted to confirm with the user that the user has lost access to the one or more email addresses on file with the social network.

At operation 502, at least one computer processor may provide, through a graphical user interface, a code to the trustee. In some examples, the at least one computer processor randomly generates the codes. In some examples, the at least one computer processor generates the code to be a randomly generated word, a randomly generated number, and/or a randomly generated alphanumeric string. In some examples, the codes are unique among the trustees.

At operation 504, at least one computer processor may provide, through the graphical user interface, instructions to the trustee to communicate the code to the user outside the social network. For example, the graphical user interface may instruct the trustee to contact the user by telephone or text, and may request that the trustee provide the code to the user by telephone or text. In some examples, the user may enter the codes into the social network at operation 210. For instance, operation 210 may include receiving from the user, through a graphical user interface, at least a specified number of the codes communicated from the trustees. These codes may be entered directly from the trustees to the social network, or may be communicated from the trustees to the user and entered by the user to the social network.

Figure 6:
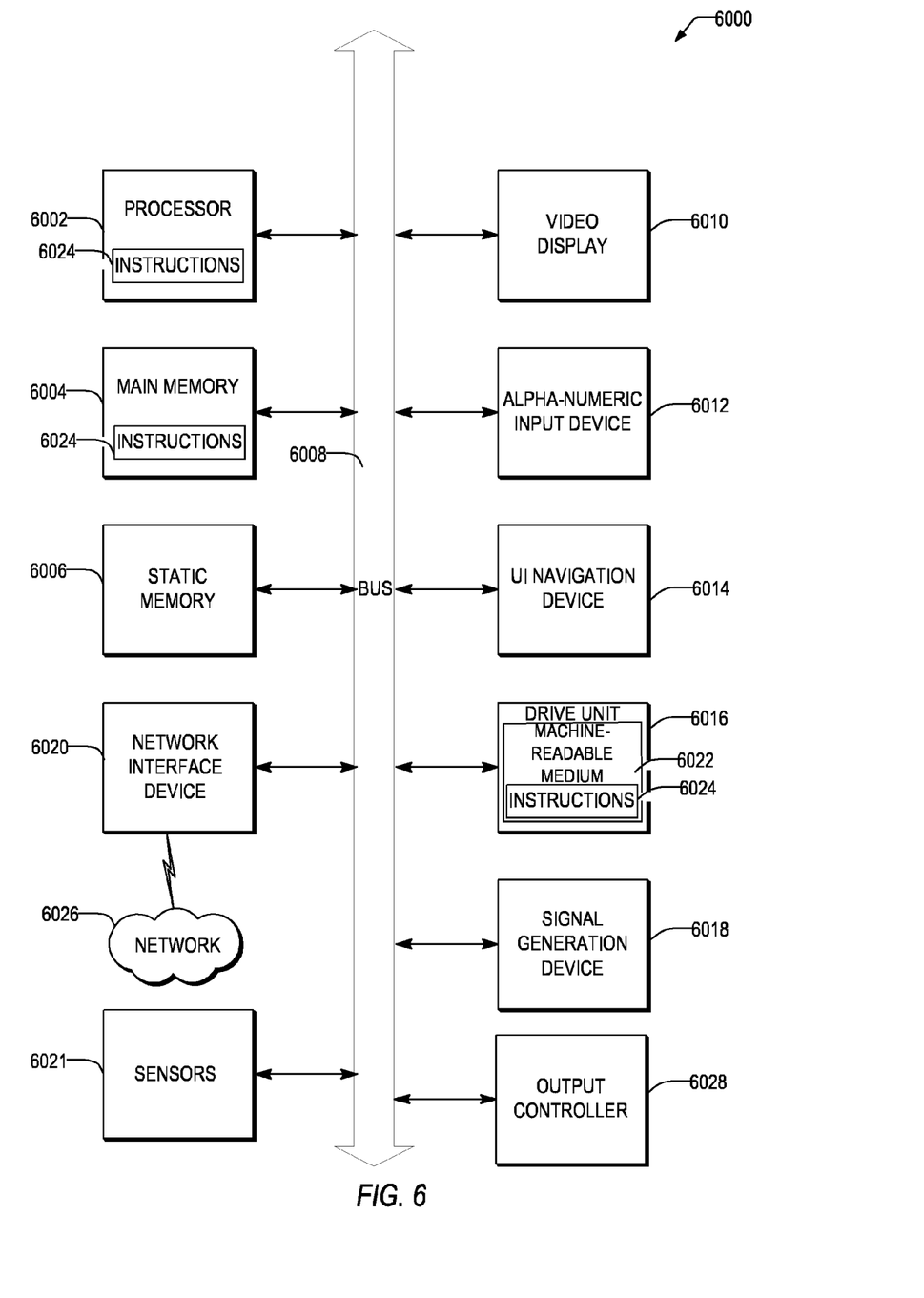
FIG. 6 illustrates a block diagram of an example of a machine upon which any one or more of the techniques (e.g., methodologies) discussed herein may perform.

FIG. 6 illustrates a block diagram of an example of a machine 6000 upon which any one or more of the techniques (e.g., methodologies) discussed herein may perform. The components of FIG. 1 may execute upon and/or include one or more of the components in FIG. 6. In alternative examples, the machine 6000 may operate as a standalone device or may be connected (e.g., networked) to other machines. In a networked deployment, the machine 6000 may operate in the capacity of a server machine, a client machine, or both in server-client network environments. In an example, the machine 6000 may act as a peer machine in peer-to-peer (P2P) (or other distributed) network environment. The machine 6000 may be a server, personal computer (PC), a tablet PC, a set-top box (STB), a personal digital assistant (PDA), a mobile telephone, a smart phone, a web appliance, a network router, switch or bridge, a component of a social networking service, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 6000 may include a hardware processor 6002 (e.g., a central processing unit (CPU), a graphics processing unit (GPU), a hardware processor core, or any combination thereof), a main memory 6004 and a static memory 6006, some or all of which may communicate with each other via an interlink (e.g., bus) 6008. The machine 6000 may further include a display unit 6010, an alphanumeric input device 6012 (e.g., a keyboard), and a user interface (UI) navigation device 6014 (e.g., a mouse). In an example, the display unit 6010, input device 6012 and UI navigation device 6014 may be a touch screen display. The machine 6000 may additionally include a storage device (e.g., drive unit) 6016, a signal generation device 6018 (e.g., a speaker), a network interface device 6020, and one or more sensors 6021, such as a global positioning system (GPS) sensor, compass, accelerometer, or other sensor. The machine 6000 may include an output controller 6028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 6016 may include a machine readable medium 6022 on which is stored one or more sets of data structures or instructions 6024 (e.g., software) embodying or utilized by any one or more of the techniques or functions described herein. The instructions 6024 may also reside, completely or at least partially, within the main memory 6004, within static memory 6006, or within the hardware processor 6002 during execution thereof by the machine 6000. In an example, one or any combination of the hardware processor 6002, the main memory 6004, the static memory 6006, or the storage device 6016 may constitute machine readable media.

While the machine readable medium 6022 is illustrated as a single medium, the term "machine readable medium" may include a single medium or multiple media (e.g., a centralized or distributed database, and/or associated caches and servers) configured to store the one or more instructions 6024.

The term "machine readable medium" may include any medium that is capable of storing, encoding, or carrying instructions for execution by the machine 6000 and that cause the machine 6000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 6024 may further be transmitted or received over a communications network 6026 using a transmission medium via the network interface device 6020. The machine 6000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 6020 may include one or more physical jacks (e.g., Ethernet, coaxial, or phone jacks) or one or more antennas to connect to the communications network 6026. In an example, the network interface device 6020 may include a plurality of antennas to wirelessly communicate using at least one of single-input multiple-output (SIMO), multiple-input multiple-output (MIMO), or multiple-input single-output (MISO) techniques. In some examples, the network interface device 6020 may wirelessly communicate using Multiple User MIMO techniques.

What is claimed is:

1. A method for confirming an identity of a user of a social network who has lost access to one or more email addresses on file with the social network, the method comprising:
   using at least one computer processor to:
      prompt the user to correctly identify pictures of members of the social network that are connected to the user;
      determine a plurality of trustees, the trustees being members of the social network who are connected to the user;
      prompt the trustees to confirm with the user that the user has lost access to the one or more email addresses; and
      receive notification that at least a specified number of the trustees have confirmed with the user that the user has lost the access.

2. The method of claim 1, wherein prompting the user to correctly identify the pictures of members of the social network that are connected to the user comprises:
   selecting a plurality of members of the social network that are connected to the user;
   displaying to the user, on a graphical user interface, pictures of the members in the plurality;
   displaying to the user, on the graphical user interface, names of the members in the plurality, the names being displayed in a different order from the pictures;
   receiving from the user, on the graphical user interface, associations between the names and the pictures, the graphical user interface limiting the input of the associations to within a specified time window; and
   determining that at least a specified number of the associations correctly match names to pictures.

3. The method of claim 2, wherein the at least one computer processor selects the plurality of members to include members connected to the user who have most recently interacted with the user through the social network.

4. The method of claim 1, wherein prompting the user to correctly identify the pictures of members of the social network that are connected to the user comprises:
   selecting a plurality of members of the social network that are connected to the user;
   displaying to the user, on a graphical user interface, pictures of the members in the plurality;
   receiving from the user, on the graphical user interface, entry of names corresponding to the pictures, the graphical user interface limiting the entry of the names to within a specified time window; and
   determining that at least a specified number of the names are correctly associated with the pictures.

5. The method of claim 4, wherein the at least one computer processor selects the plurality of members to include members connected to the user who have most recently interacted with the user through the social network.

6. The method of claim 1, wherein the at least one computer processor includes a graphical user interface that prompts the user to select the trustees after:
   receiving a password change request from the user; and
   then after prompting the user to correctly identify the pictures of members of the social network that are connected to the user.

7. The method of claim 1, wherein the at least one computer processor selects the trustees.

8. The method of claim 1, wherein prompting the trustees to confirm with the user that the user has lost the access comprises, for each trustee:
   providing, through a graphical user interface, a code to the trustee; and
   providing, through the graphical user interface, instructions to the trustee to communicate the code to the user outside the social network.

9. The method of claim 8, wherein receiving notification that at least the specified number of the trustees have confirmed with the user that the user has lost the access comprises:
   receiving from the user, through a graphical user interface, at least a specified number of the codes communicated from the trustees.

10. The method of claim 1, further comprising:
    using the at least one computer processor to:
       receive a password change request from the user; and
       change the password for the user.

11. A social network system for confirming an identity of a user of a social network who has lost access to one or more email addresses on file with the social network, the system comprising:
    at least one processor; and
    memory, including instructions that, when executed on the at least one processor, cause the at least one processor to:
       prompt the user to correctly identify pictures of members of the social network that are connected to the user;
       select or receive a selection of a plurality of trustees, the trustees being members of the social network who are connected to the user;
       prompt the trustees to confirm with the user that the user has lost the access; and
       receive notification that at least a specified number of the trustees have confirmed with the user that the user has lost the access.

12. The system of claim 11, wherein the at least one computer processor receives the selection of the trustees after:

receiving a password change request from the user; and then after prompting the user to correctly identify the pictures of members of the social network that are connected to the user.

13. The system of claim 11, wherein prompting the trustees to confirm with the user that the user has lost the access comprises, for each trustee:
   providing, through a graphical user interface, a code to the trustee; and
   providing, through the graphical user interface, instructions to the trustee to communicate the code to the user outside the social network.

14. The system of claim 13, wherein receiving notification that at least the specified number of the trustees have confirmed with the user that the user has lost the access comprises:
   receiving from the user, through a graphical user interface, at least a specified number of the codes communicated from the trustees.

15. The system of claim 11, wherein the at least one computer processor is further configured to:
   receive a password change request from the user; and
   change the password for the user.

16. A non-transitory machine-readable medium, including instructions, which when executed by the machine, cause the machine to perform operations for confirming an identity of a user of a social network who has lost access to one or more email addresses on file with the social network, the operations comprising:
   prompting the user to correctly identify pictures of members of the social network that are connected to the user;
   selecting or receiving a selection of a plurality of trustees, the trustees being members of the social network who are connected to the user;
   prompting the trustees to confirm with the user that the user has lost the access; and
   receiving notification that at least a specified number of the trustees have confirmed with the user that the user has lost the access.

17. The machine-readable medium of claim 16, wherein prompting the user to correctly identify the pictures of members of the social network that are connected to the user comprises:
   selecting a plurality of members of the social network that are connected to the user;
   displaying to the user, on a graphical user interface, pictures of the members in the plurality;
   displaying to the user, on the graphical user interface, names of the members in the plurality, the names being displayed in a different order from the pictures;
   receiving from the user, on the graphical user interface, associations between the names and the pictures, the graphical user interface limiting the input of the associations to within a specified time window; and
   determining that at least a specified number of the associations correctly match names to pictures.

18. The machine-readable medium of claim 16, wherein prompting the user to correctly identify the pictures of members of the social network that are connected to the user comprises:
   selecting a plurality of members of the social network that are connected to the user;
   displaying to the user, on a graphical user interface, pictures of the members in the plurality;
   receiving from the user, on the graphical user interface, entry of names corresponding to the pictures, the graphical user interface limiting the entry of the names to within a specified time window; and
   determining that at least a specified number of the names are correctly associated with the pictures.

19. The machine-readable medium of claim 16, wherein prompting the trustees to confirm with the user that the user has lost the access comprises, for each trustee:
   providing, through a graphical user interface, a code to the trustee; and
   providing, through the graphical user interface, instructions to the trustee to communicate the code to the user outside the social network.

20. The machine-readable medium of claim 19, wherein receiving notification that at least the specified number of the trustees have confirmed with the user that the user has lost the access comprises:
   receiving from the user, through a graphical user interface, at least a specified number of the codes communicated from the trustees.

* * * * *